US010420169B1

(12) United States Patent
Jamerson

(10) Patent No.: US 10,420,169 B1
(45) Date of Patent: Sep. 17, 2019

(54) INTUITIVE REMOTE LAND MOBILE RADIO TALK-GROUP ASSIGNMENT

(71) Applicant: Eagle Technology, LLC, Melbourne, FL (US)

(72) Inventor: Eric M. Jamerson, Prospect, VA (US)

(73) Assignee: Eagle Technology, LLC, Melbourne, FL (US)

( * ) Notice: Subject to any disclaimer, the term of this patent is extended or adjusted under 35 U.S.C. 154(b) by 0 days.

(21) Appl. No.: 16/196,762

(22) Filed: Nov. 20, 2018

(51) Int. Cl.
| | |
|---|---|
| *H04W 84/08* | (2009.01) |
| *H04W 4/08* | (2009.01) |
| *G06K 19/06* | (2006.01) |
| *G06K 19/04* | (2006.01) |
| *H04W 4/80* | (2018.01) |

(52) U.S. Cl.
CPC .......... *H04W 84/08* (2013.01); *G06K 19/045* (2013.01); *G06K 19/06028* (2013.01); *H04W 4/08* (2013.01); *H04W 4/80* (2018.02)

(58) Field of Classification Search
CPC ......... H04W 4/08; H04W 4/80; H04W 84/08; H04W 84/12; H04W 84/18; H04W 84/20; G06K 19/045; G06K 19/06028
See application file for complete search history.

(56) References Cited

U.S. PATENT DOCUMENTS

| | | | |
|---|---|---|---|
| 9,106,267 B1 * | 8/2015 | Cope ........................ | H04B 5/00 |
| 10,074,268 B2 | 9/2018 | Hor-Lao et al. | |

\* cited by examiner

*Primary Examiner* — Raymond S Dean
(74) *Attorney, Agent, or Firm* — Fox Rothschild LLP; Robert J. Sacco; Carol E. Thorstad-Forsyth

(57) ABSTRACT

Automated talkgroup assignment system includes a work group assignment panel. Interactive display sections are provided in the panel to removably receive placards for display. The placards each include a short range communication (SRC) tag and have textual information on a display face thereof to identify a member of a work group. The interactive display sections each have one or more SRC enabled devices which obtain tag identifying data (TID) from the SRC tag when a placard associated with that SRC tag is disposed proximate to the SRC enabled device in the interactive display section. A control processor receives the TID values and generates one or more data messages based on the TID received. The data message(s) indicate which of the plurality of placards are displayed respectively in each of the interactive display sections to facilitate setting of a talkgroup channel.

24 Claims, 7 Drawing Sheets

INTUITIVE REMOTE LAND MOBILE RADIO TALK-GROUP ASSIGNMENT

BACKGROUND

Statement of the Technical Field

The technical field of this disclosure concerns land mobile radio communications systems, and more particularly methods and systems to assist with the dynamic assignment of talk-group channels.

Description of the Related Art

First responders such as firefighters are sometimes organized into work groups that need to communicate with each other. For example, firefighter incident commanders are responsible for assigning firefighters to working groups when responding to fires. Examples of such working groups might include groups of firefighters who are tasked with responsibility to manage certain aspects of the firefighting activity such as hoses, ladders, search and rescue, and so on. These assignments are commonly changed after a short period of time to allow firefighters to rest. The conventional approach is to communicate such work assignment using voice communications, either in person or using Land Mobile Radio (LMR) equipment carried by the firefighters. These work assignment are then tracked by the incident commander using an erasable whiteboard on which the firefighter names are listed in association with certain tasks.

While actively working their assignment, firefighters need to be able to use their radio equipment to communicate with their teammates. The conventional approach for facilitating such radio communications is to instruct the firefighters who are assigned to the various working groups to communicate on certain predefined channels or talk-groups. Once so informed, the individual firefighters will manually operate the controls of their individual radios to select the channel or talk-group on which they will communicate with other firefighters. But this manual selection and control process can be challenging in many instances due to the protective gear worn by firefighters (large gloves) and the location where the radios are carried (e.g., inside of jacket pockets).

SUMMARY

This document concerns an automated talkgroup assignment system. The system is comprised of a work group assignment panel having a display face. A plurality of interactive display sections are provided in the display face, disposed at a plurality of different locations. Each of these interactive display sections is configured to removably receive for display one or more of a plurality of placards. The placards each include a short range communication (SRC) tag affixed thereto. In some scenarios, the SRC tag is selected from the group consisting of a radio frequency identification (RFID) tag, a near field communication (NFC) tag, and a barcode tag.

Each of the placards has textual information (such as a person's name) disposed on a placard display face thereof which identifies a member of a work group. Each of the interactive display sections include one or more SRC enabled devices which are configured to obtain tag identifying data (TID) from an SRC tag when the placard associated with that SRC tag is disposed proximate to the SRC enabled device in the interactive display section. A control processor receives the TID values acquired by the SRC enabled devices which are respectively associated with the plurality of interactive display sections. The control processor is configured to generate one or more data messages based on the TID received. The data message(s) indicate which of the plurality of placards are displayed respectively in each of the interactive display sections.

In some scenarios, the one or more data messages generated by the automated talk group assignment system will specify at least one placard identifying data (PID) for each of the plurality placards displayed in the interactive display sections. According to one aspect, this PID can be selected from the group consisting of the TID, information which directly or indirectly indicates the particular member of the work group identified by the textual information disposed on the placard, and a device subscriber identifier (DSID) which directly or indirectly identifies a particular land mobile radio (LMR).

The one or more data messages can also include therein at least one interactive display section identifier (IDSI). The IDSI will have a defined value which corresponds to a specific one of the interactive display sections to specify the interactive display section in which one or more of the plurality of placards is displayed. The display panel can include a plurality of IDSI name panels which are respectively disposed adjacent to corresponding ones of the interactive display sections to facilitate name identification of a work group associated with a particular interactive display section. In some scenarios, the IDSI name panel is an electronic display screen responsive to the control processor, whereby textual information displayed on the IDSI name panel can be selectively electronically controlled. In other scenarios, the IDSI name panel is comprised of an SRC enabled device which is configured to obtain IDSI tag data responsive to an SRC tag disposed in an IDSI name panel placard. In such instances the control processor can be configured to receive the IDSI tag data acquired by the SRC enabled device in the IDSI name panel.

An automated talk group assignment system can further include a talk group assignment server (TGAS). The TGAS can be provided as part of an LMR system infrastructure. The TGAS is responsive to the one or more messages received from the display panel to cause an LMR infrastructure to set a talk group or channel to be used by at least one LMR subscriber radio. In such a scenario, the TGAS can be advantageously configured to use the PID directly or indirectly to identify the LMR subscriber radio for which a talk group channel is to be set. More particularly, the talk group channel can be set in accordance with the interactive display section in which the placard corresponding to the PID is displayed.

The solution also concerns a method for automated talk group assignment. The method involves removably receiving for display one or more a plurality of placards in a plurality of interactive display sections of a display panel. Each of the placards will include an SRC tag affixed thereto as described above. Likewise, each of the placards can include textual information disposed on a placard display face thereof to indicates a member of a work group. In each of the interactive display sections, at least one SRC enabled device is used to obtain a TID from at least one the SRC tags when the placard associated with the at least one SRC tag is disposed proximate to the SRC enabled device. The method further involves receiving in a control processor a plurality of the TID acquired by the SRC enabled devices. The control then generates at least one data message based on the TID received so as to indicate which of the plurality of placards are displayed respectively in each of the interactive display sections.

BRIEF DESCRIPTION OF THE DRAWINGS

This disclosure is facilitated by reference to the following drawing figures, in which like numerals represent like items throughout the figures, and in which.

DETAILED DESCRIPTION

Figure 1:
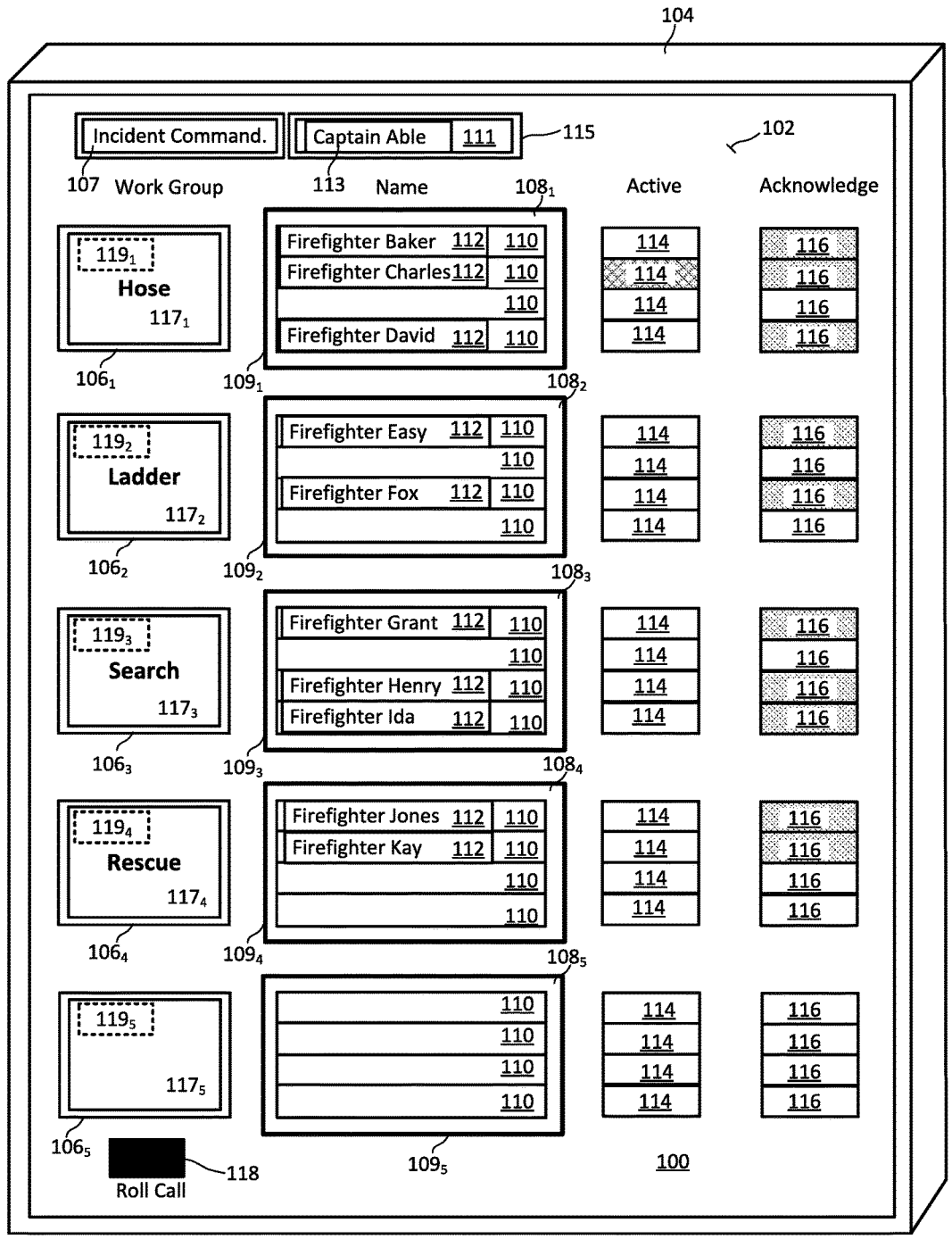
FIG. 1 is a drawing which is useful for understanding an automated work group assignment panel (WAP).

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

The methods and/or systems disclosed herein may provide certain advantages for making automated channel or talkgroup assignments to radio equipment which is assigned team members associated with one or more work groups. The solution involves an automated talkgroup assignment system based on a work group assignment panel (WAP). The WAP communicates with components of an LMR system infrastructure to facilitate automatic assignment of radio channels and/or talk groups to radios associated with individual work group team members.

Moveable nametags or placards for each team member are enabled with a short range communications (SRC) capability. The placards are removably positioned at certain locations on the WAP in in accordance with the work group assignments of the team members. The WAP includes a plurality of SRC communication devices to determine which placards are disposed or displayed in each section of the WAP, and to obtain from the placard certain tag identifying information. The position of the placard on the board, and the tag identifying information are used by the WAP to automatically identify a work group to which a specific team member has been assigned. This information is then used to automatically control the channel or talkgroup setting for radios assigned to each team member. For example, the radios equipment of members of a particular work group can be assigned to a common predetermined channel or talkgroup. These channel/talkgroup assignments are automatically communicated to the radios of those team members to cause them to select a particular channel or talkgroup. This allows a team member (such as a fully suited-up firefighter to talk to the other members of their group without having to interact with their radio buttons/knobs directly).

Figure 2A:
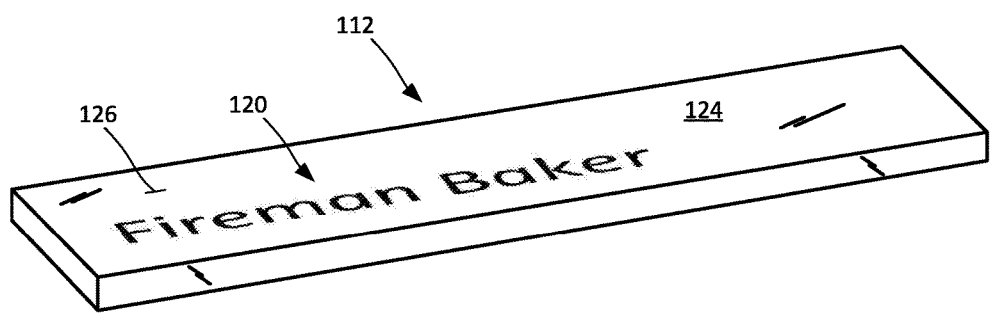
FIGS. 2A and 2B are a series of drawings that are useful for understanding a short range communication (SRC) enabled placard.
Figure 2B:
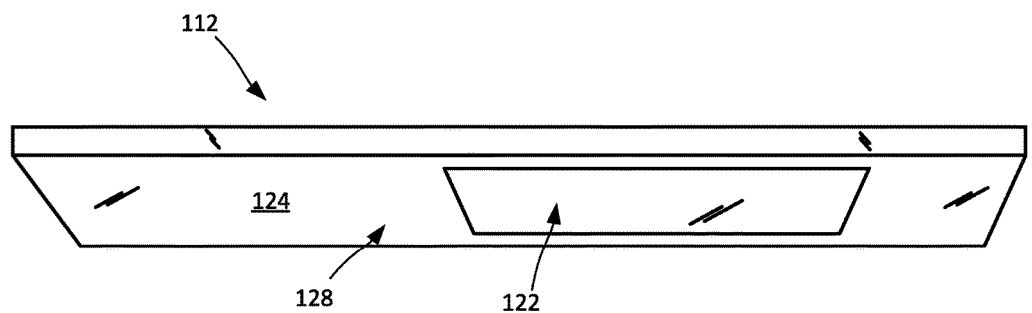
Figure 3A:
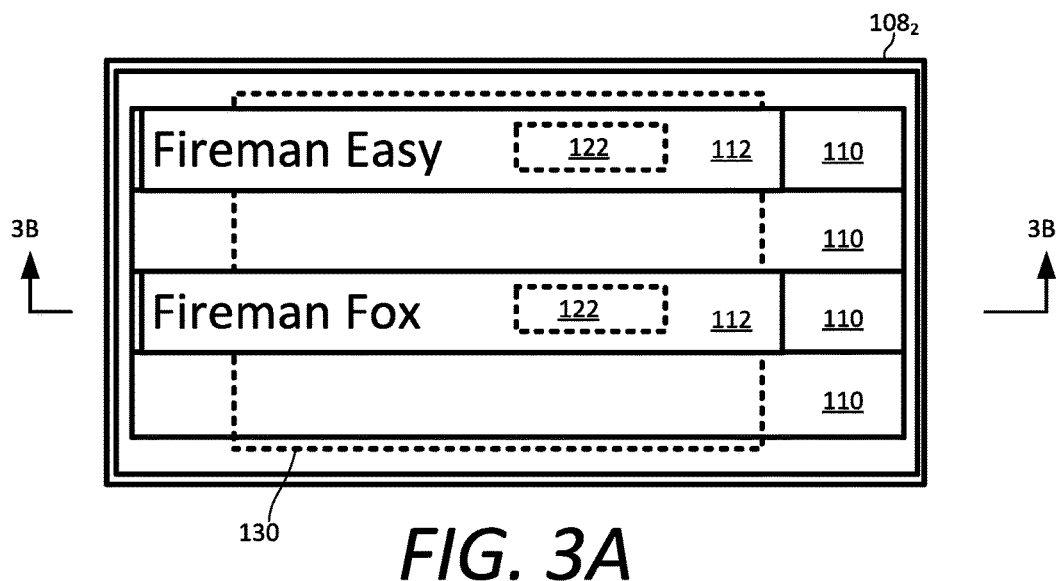
FIG. 3A is a drawing which is useful for understanding an SRC enabled interactive display section of the WAP in FIG. 1.
Figure 3B:
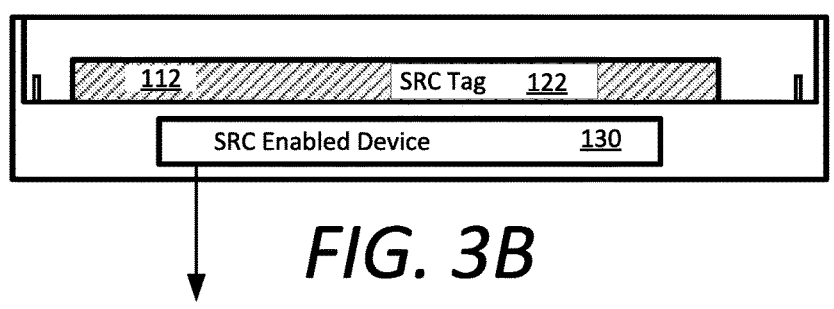
FIG. 3B is a cross-sectional view, taken along line 3B-3B in FIG. 3A.

Referring now to FIG. 1-3 it can be observed that an automated talkgroup assignment system includes a WAP 100 comprising a display face 102. In some scenarios, the WAP can be disposed in a housing 104. The display face 102 includes a plurality of interactive display sections $108_1$, $108_2$, $108_3$, $108_4$, $108_5$ (hereinafter $108_1 \ldots 108_5$) which are disposed at a plurality of different locations $109_1$, $109_2$, $109_3$, $109_4$, $109_5$ (hereinafter $109_1 \ldots 109_5$) on the display face. In FIG. 1, the interactive display sections are shown to be arranged in a column, but it should be understood that the exact arrangement is not critical. In other scenarios, interactive display sections could be arranged in a row or grid format to suit a particular application. In the scenario shown in FIG. 1, there are five of the interactive display panels shown. However, it should be understood that more or fewer of the interactive display panels could be included in a particular application. The WAP 100 can include a plurality of name panels $106_1$, $106_2$, $106_3$, $106_4$, $106_5$ (hereinafter $106_1 \ldots 106_5$) which are respectively disposed adjacent to each of the interactive display sections $108_1 \ldots 108_5$. These panels are used to provide a visual identifier of the interactive display sections. In some scenarios, the WAP 100 can further include a command interactive display panel 115.

Each of the interactive display sections $108_1 \ldots 108_5$ is configured to removably receive for display one or more a plurality of placards 112. For example, in some scenarios retention channels or slots 110 can be provided to removably retain each placard in position within each of the interactive display sections. According to one aspect, each placard 112 can comprise a panel 124 to which an SRC tag 122 affixed thereto. In some scenarios, the SRC tag 122 can be embedded in the panel 124. Each of the placards can further include textual information 120 disposed on a placard display face 126 thereof. The textual information can advantageously comprise textual information which indicates a member of a work group. For example, this indication can comprise a work group member name, a member assignment (e.g., ladder operator, or pump controller), an alphanumeric employee identifier (e.g., an employee ID number), and/or or a radio subscriber ID information of a radio carried by the member. The textual information can be displayed prominently on the placard so that it is easily visible.

Each of the interactive display sections $108_1 \ldots 108_5$ will include at least one SRC enabled device 130. Each of the SRC enabled devices is configured to read or otherwise obtain tag identifying data (TID) from at least one SRC tag 122 when the SRC tag is disposed in proximity to the interactive display section $108_1 \ldots 108_5$. Accordingly, when a placard 112 associated with the SRC tag 122 is disposed proximate to the SRC enabled device 130 in the interactive display section, the TID from that SRC tag will be obtained by the SRC enabled device. Each of the SRC enabled devices 130 is configured to communicate the TID information from the SRC tags to a WAP control processor. In some scenarios, the TID information can be communicated with an interactive display section identifier (IDSI) to indicate to the control processor which of the SRC enabled devices 130 is the source of the detected TID. Accordingly, by using the TID information associated with the SRC tag, and the IDSI information associated with a particular interactive display section, a WAP control processor can directly or indirectly determine information concerning a work group member corresponding to the textual information the placard 112.

In some scenarios, the SRC tag 122 that is attached to the placard 112 can be a radio frequency identification (RFID) tag, a near field communication (NFC) tag, and a barcode tag. The SRC enabled device 130 is selected in accordance with the type of tag technology used in the placard 112. For example, the SRC enabled device 130 can be an RFID tag reader, an NFC tag reader, or a barcode tag reader so that it is capable of reading tag identifying data (TID) from the SRC tag 122. Each of these short range communication technologies are well-known and therefore will not be described here in detail. However, a brief discussion is provided below with respect to each of these technologies.

It should be understood that RFID is an automatic identification method, in which data is stored and remotely retrieved from RFID tags. RFID tags contain electronic solid state circuits which enable them to receive and respond to queries from an RFID reader/writer. An NFC-enabled SRC enabled device 130 is one that is capable of reading NFC Forum-mandated tag types. The standards established for NFC include a reader/writer mode which is compliant with the NFC-A, NFC-B and NFC-F schemes. A barcode is an optical, machine-readable representation of data which can be read by an optical reader. Barcodes are well-known and include a wide variety of different types, including Code 39, Code 128, 125, PDF417, Data Matrix, and Quick Response (QR) codes. These and other types of barcodes now known, or known in the future, can be used in the solution described herein.

If RFID technology is used, the SRC tag 122 is advantageously a passive device which collects energy from interrogating radio waves produced by a nearby RFID reader (i.e., and NFC device 130). If NFC technology is utilized for this purposes, the system can be configured to operate in a reader/writer NFC mode whereby the SRC enabled device 130 is an NFC enabled device configured to read information from inexpensive NFC tags. If barcode technology is used, any suitable barcode type can be disposed on a face of the placard 112 in a location where it can be optically scanned by the SRC enabled device 130. For example, in some scenarios, the barcode can be disposed on a reverse face 128 of the placard, opposed from the display face 126.

It will be appreciated that the close proximity of the interactive display sections is such that the SRC tag 122 and SRC enabled device 130 reader technology should be chosen in combination to have a relatively short communication range. This short communication range can be understood as a range wherein SRC tags 122 that are disposed in a first interactive display section (e.g., interactive display section $108_2$) are not read by SRC enabled devices 130 in adjacent or nearby interactive display section(s) (e.g., interactive display section $108_1$ or $108_3$). In some scenarios, this relatively short communication range can be selected such that an SRC enabled device associated with a particular interactive display area is only able to read SRC tags that are actually within a defined area associated with that interactive display area. Accordingly, the actual range of the SRC communication can be selected in part based on the relative proximity of adjacent interactive display areas. Closer spacing between interactive display sections can require tighter control over communication ranges.

The communication range of the SRC tags and SRC enabled devices can be maintained by one or more well-known techniques such as limiting a transmit power levels of interrogation signals produced by the SRC enabled device 130, controlling a receive sensitivity of the SRC tags 122, and limiting a tag transmit energy level associated with a response to the interrogation signal. In some scenarios, where an SRC tag may be inadvertently or undesirably read by two or more SRC enabled devices 130 associated with two or more interactive display sections, the read responses of one or more of the SRC enabled devices 130 can be compared to filter out erroneous reads. This can be accomplished by various means which could involve signal level comparisons, the number of times the TID is read by each SRC reader, and/or a logical evaluation based on the locations of the particular SRC enabled devices 130 which read the SRC tag. If the SRC tag 122 is a barcode, then the SRC enabled device 130 will comprise an optical reader comprised of an imaging device.

The SRC tags 122 and SRC enabled devices 130 described herein are noted as examples of possible implementations, and are not intended to limit the types of SRC tags and SRC enabled devices which can be used. Instead, it should be understood that any suitable type of tag and reader technology can be applied, whether now known, or known in the future.

The WAP 100 can include a plurality of name panels $106_1$, $106_2$, $106_3$, $106_4$, $106_5$ (hereinafter $106_1 \ldots 106_5$) which are respectively disposed adjacent to each of the interactive display sections $108_1 \ldots 108_5$. These name panels are provided to facilitate name identification of a work group associated with each of the interactive display sections $108_1 \ldots 108_5$. In FIG. 1, a scenario is illustrated for a firefighter work group in which a fire incident commander has assigned certain firefighters to certain work groups associated with each firefighting task. As such, firefighters Baker, Charles and David are assigned to a Hose work group; firefighters Easy and Fox are assigned to a Ladder work group, firefighters Grant, Henry and Ida are assigned to a Search work group; and firefighters Jones and Kay are assigned to a Rescue work group. Hose, Ladder, Search and Rescue are the names of the assigned work groups in this scenario.

It can be observed that name panel $106_5$ has not been assigned a name and is unused in the example shown in FIG. 1. In other scenarios, name panel $106_5$ could be assigned a name and could have firefighter placards disposed in the interactive display panel $108_5$. For example, the name panel $106_5$ could be assigned the name "Ventilation" or "Utility". In other scenarios, if there is insufficient space in one interactive display area (e.g., interactive display area $108_4$) to fit all of the placards associated with a particular work group, then a second interactive display area (e.g., interactive display area $108_5$) can be assigned to the same named work group, and additional placards can be added to the second interactive display area.

In some scenarios, the name panels $106_1 \ldots 106_5$ can be conventional printed panels which are affixed to the WAP adjacent to the interactive display areas. Such an arrangement can be suitable for situations where the same named work groups are always in use. However, in some scenarios it can be advantageous to configure the name panels so that they can be changed in accordance with different mission requirements. As such, the name panels $106_1 \ldots 106_5$ can in some scenarios be individually comprised of an electronic display screens 412. Such an electronic display screen can be responsive to a WAP control processor, whereby textual information displayed on the name panel can be selectively electronically controlled.

In other scenarios, the name panels $106_1 \ldots 106_5$ can comprise an arrangement similar to the placards 112 and interactive display areas $108_1 \ldots 108_5$. As such, the name panels $106_1 \ldots 106_5$ can be comprised of SRC enabled devices 426 which are responsive to SRC tags $119_1 \ldots 119_5$ attached to removably displayed work group name panel placards $117_1 \ldots 117_5$. Each work group name panel placard $117_1 \ldots 117_5$ can have textual information specifying a name of a particular work group, such as Hose, Ladder, Search or Rescue. In such a scenario, the WAP control processor can receive from an SRC enabled device 426 a TID for an SRC tag $119_1 \ldots 119_5$ attached to a work group name panel placard. Consequently, the control processor can directly or indirectly determine the name that has been assigned to an adjacent interactive display section. For example, a WAP control processor can access a look up table (LUT) that relates a particular TID value to a corresponding work group name.

In some scenarios, the WAP 100 can include an command interactive display panel 115. The command interactive display panel 115 can have a retention channel or slot 111 for removably receiving and retaining a command placard 113, which identifies an incident commander. The command placard 113 can have a SRC tag (not shown) which is similar to the SRC tags 122 that are used in the placards 112. Similarly, the command interactive display panel 115 can have an SRC enabled device 420 that is similar to the SRC enabled devices 130 that are included in the interactive display panels $108_1 \ldots 108_5$. As such, a WAP control processor can use a TID from an SRC tag associated with a command placard 113 to determine an identity of an incident commander in a manner which is similar to the way in which work group members are determined using the placards 112. A name panel 107 can be provided to indicate a command position associated with the command interactive display panel. The name panel 107 can have a configuration similar to the name panels $106_1 \ldots 106_5$. As such, the information in the name panel 107 can be a conventional printed panel containing textual data, an electronic display under the control of a WAP control processor, or can use an SRC enabled placard arrangement similar to the name panels $106_1 \ldots 106_5$.

The WAP can also include a plurality of input and output devices which can include indicator lamps 114, 116, and one or more control keys such as a rollcall control switch 118. The purpose of these components will be described below in greater detail.

Figure 4:
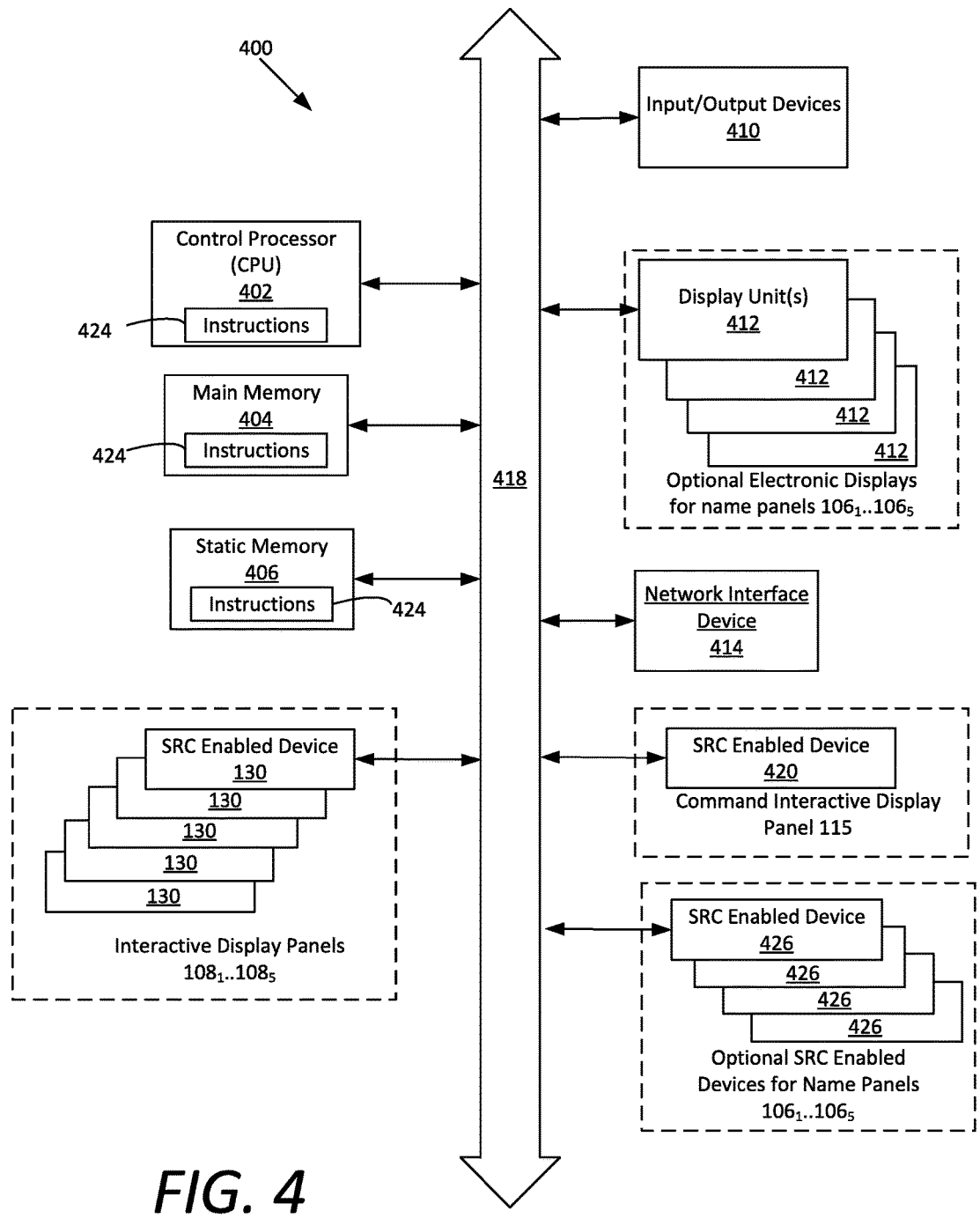
FIG. 4 is a block diagram that is useful for understanding one example of an architecture for the WAP in FIG. 1.

Shown in FIG. 4 is a hardware block diagram 400 which is useful for understanding the WAP 100 in FIG. 1. The system can comprise one or more components such as a processor, an application specific circuit, a programmable logic device, a digital signal processor, or other circuit programmed to perform certain functions described herein. As such, it should be understood that the machine can also include a set of instructions which are used to cause the WAP 100 to perform any one or more of the methodologies discussed herein. In some scenarios, the WAP 100 can operate independently as a standalone device. However, the disclosure is not limited in this regard and in other scenarios the system can be operatively connected (networked) to other machines in a distributed environment to facilitate certain operations described herein.

The WAP is comprised of a control processor 402 (e.g. a central processing unit or CPU), and can include a main memory 404, and a static memory 406 comprised of machine readable media. The system includes input/output devices 410, one or more display units 412 (e.g. a liquid crystal display (LCD), a solid state display) and a network interface device 414. The system further includes an optional SRC enabled device 420 associated with a command interactive display section 115, and a plurality of SRC 130 associated with the interactive display sections $108_1 \ldots 108_5$. In some scenarios the system can also include a plurality of SRC enabled devices 426 associated with the name panels $106_1 \ldots 106_5$. If name panel placards are used, these SRC enabled devices 426 facilitate SRC enabled communications with SRC tags provided in such name panel placards. Communications among these various components can be facilitated by means of a data bus 418.

The display units 412 can be used to facilitate the work group name panels $106_1 \ldots 106_5$. As such, the display units 412 can operate under the control of control processor 402 to display work group identifying information for each interactive display section $108_1 \ldots 108_5$, such as the names: Hose, Ladder, Search, and/or Rescue. The input/output devices 410 can include a keyboard, a mouse, a multi-touch surface (e.g. a touchscreen) and so on to facilitate user entry of control inputs. In some scenarios, these input/output devices can be used to specify the names to be assigned to each of the display sections and/or the names displayed in display units 412. The input/output devices can also include at least one manually activated switch 118 to activate a roll call function described below in greater detail.

One or more sets of instructions 424 can be stored completely or partially in one or more of the main memory 404 and static memory 406. The instructions can also reside within the processor 402 during execution thereof by the computer system. The network interface device 414 can be comprised of hardware components and software or firmware to facilitate wired or wireless network data communications in accordance with a network communication protocol utilized by a data network. For example, the network interface device 414 can facilitate communications with an LMR subscriber radio whereby the WAP 100 can communicate with an LMR infrastructure.

The main memory 404 can comprise a machine readable medium. The term "machine-readable medium" shall be understood to include any tangible medium that is capable of storing instructions or data structures which facilitate any one or more of the methodologies of the present disclosure. Exemplary machine-readable media can include magnetic media, solid-state memories, and so on.

The system 400 should be understood to be one possible example of a system architecture which can be used in connection with the various implementations disclosed herein. However, the systems and methods disclosed herein are not limited in this regard and any other suitable system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems broadly include a variety of electronic and computer systems. In some scenarios, certain functions can be implemented in two or more specific interconnected hardware modules or devices with related control and data signals communicated between and through the modules, or as portions of an application-specific integrated circuit. Thus, the exemplary system is applicable to software, firmware, and hardware implementations.

Figure 5:
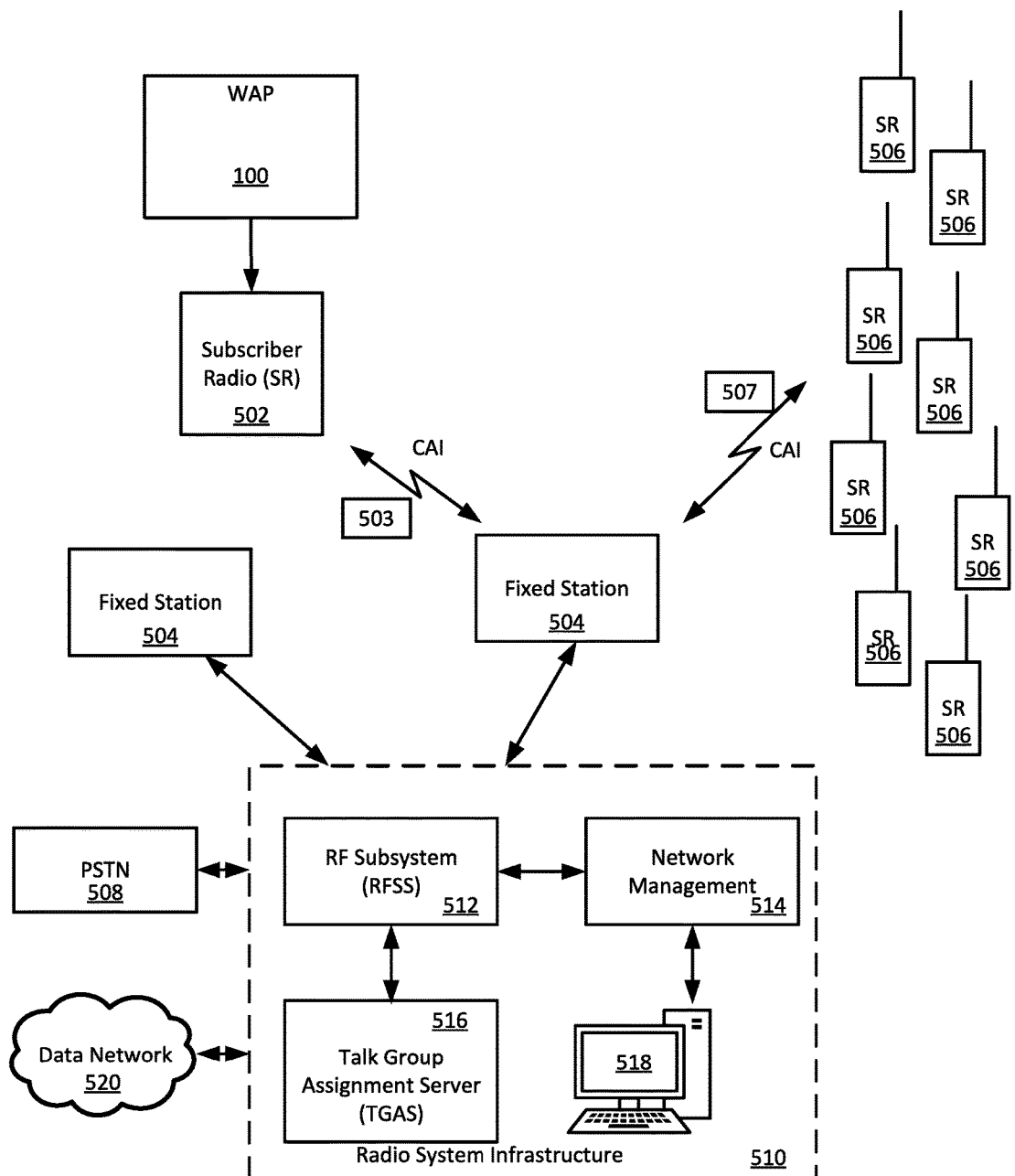
FIG. 5 is a block diagram which is useful for understanding how the WAP in FIG. 1 is used in an LMR communication system.

Turning now to FIG. 5, it can be observed that the WAP 100 can be configured to communicate with an LMR system infrastructure 510. In some scenarios, the LMR system can be an analog or digital LMR system operating in accordance with a predefined LMR system standard. Examples of digital LMR system which can be used include TETRA, P25, Tetra, dPMR, DMR and TETRAPOL. In some scenarios, the LMR system can comprise LTE-integrated LMR subscriber radios which take advantage of LTE infrastructure to facilitate voice and/or data communications.

In an exemplary arrangement shown in FIG. 5, the radio system infrastructure 510 is assumed to be based on the P25 communication standard. As such, the radio system infrastructure 510 includes an RF Subsystem (RFSS) 512, a network management server 514 and an LMR control console 518. In some scenarios, the radio system infrastructure communicates with a public switched telephone network (PSTN) 508 and/or a data network 520. To facilitate certain functions described herein, the solution can also involve a talk group assignment server (TGAS) 516 which is integrated with the radio system infrastructure 510, and communicates with the WAP 100 using a common air interface (CAI) as hereinafter described.

According to one aspect, the WAP 100 communicates with the TGAS 516 to facilitate certain channel or talkgroup assignment methods as described herein. These communications can be facilitated by a subscriber radio (SR) 502 which allows the WAP 100 to communicate with the radio system infrastructure 510 through one or more of the fixed stations 504. In such a scenario, the SR 502 can communicate with the one or more fixed stations 504 in accordance with the CAI defined for the LMR network. For example, the SR 502 can communicate with the radio system infrastructure 510 using non-voice data messages 503. Also shown in FIG. 5 are a plurality of subscriber radios (SR) 506 which are assigned to work group members. These subscriber radios allow work group members to communicate with other users of the LMR system. Each of these SRs 506 will have a device subscriber identifier (DSID) which allows each SR to be independently addressed by the radio system infrastructure 510. For example, the radio system infrastructure can communicate with the SRs 506 using non-voice data messages 507 in accordance with the CAI. The foregoing arrangement involving SR 502 is disclosed as one possible way that the WAP 100 could communicate with the radio infrastructure 510. However, it should be understood that the solution is not limited in this respect and in other scenarios, the SR 502 could instead use an LTE communication network (e.g., data network 520) to communicate with the radio infrastructure 510, and ultimately with TGAS 516.

Figure 6:
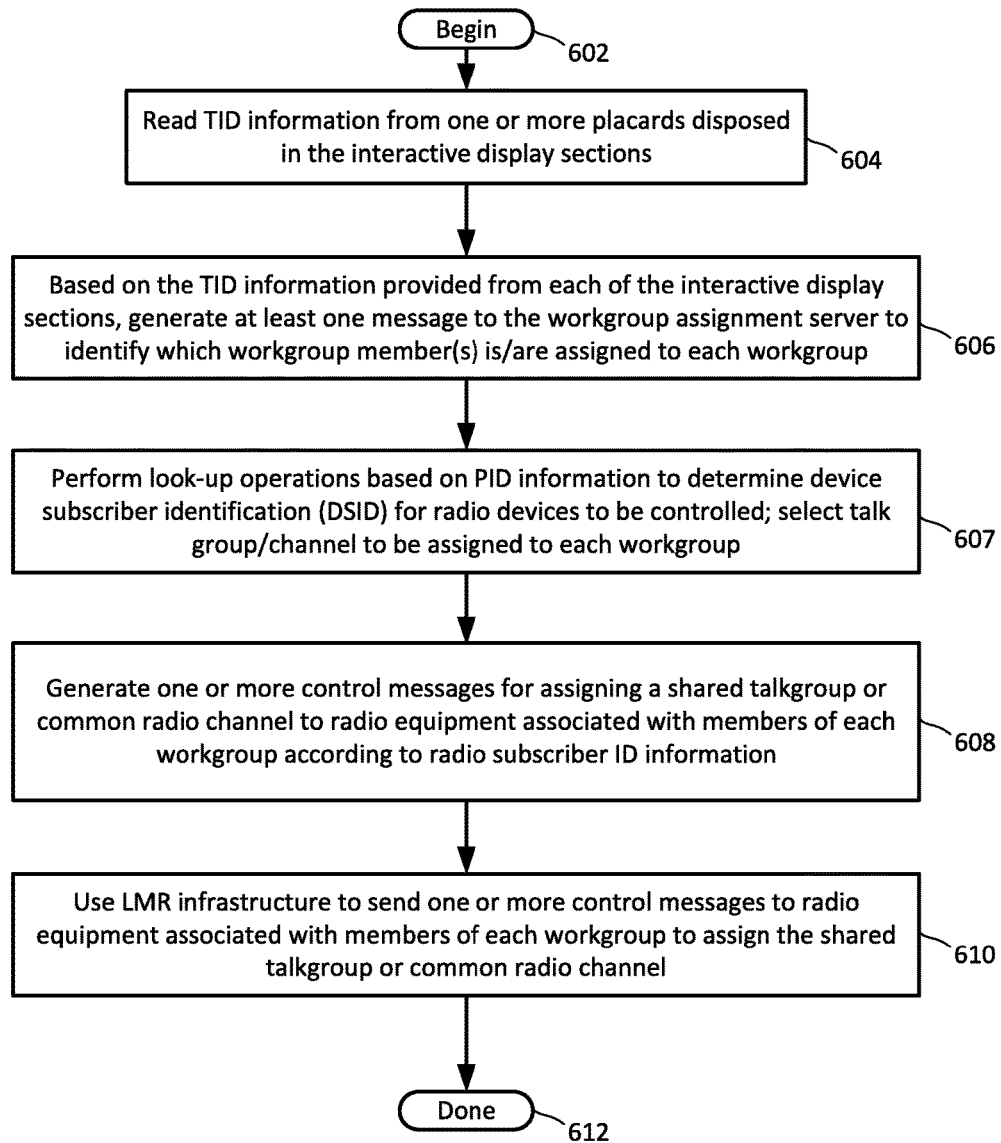
FIG. 6 is a flowchart that is useful for understanding the operation of the WAP in an LMR communication system.

Turning now to FIG. 6 there is a flowchart which is useful for understanding an how the WAP 100 can interact with an LMR communication system to facilitate automatic talk group or channel assignments to subscriber radios. The process begins at 602 and continues to 604, where the WAP control processor reads TID information from one or more placards disposed in the interactive display sections. This process is facilitated by SRC tags in the placards and SRC enabled devices associated with each of the interactive display sections. Based on the TID information provided from each of the interactive display sections, the control processor generates at least one message at 606. This message or messages is/are directed to the TGAS 516. The message(s) indicate directly or indirectly which work group member(s) is/are assigned to each work group. This information can be conveyed to the TGAS 516 in various ways. For example, one possibility is to communicate to the TGAS 516 an interactive display section identifier (IDSI) and a list of placard identifier (PID) values for placards displayed at a particular interactive display section $108_1$ ... $108_5$. In such a scenario, the IDSI can serve as a work group identifier.

The PID can be any identifier that is useful for identifying the placard which is disposed in the interactive display section (or a work group member associated with the placard). As such, the PID for a particular placard can in some scenarios be the same as the TID value. However, the solution is not limited in this regard and in other scenarios the PID can be a value that is determined based on the TID. In such a scenario, the PID can be any information which directly or indirectly identifies a particular placard or a particular member of the work group referenced by the textual information disposed on the placard. For example, the PID can also be an employee identification number. The PID can also be comprised of a device subscriber identifier (DSID) which directly or indirectly identifies a particular land mobile radio (LMR).

Figure 7:
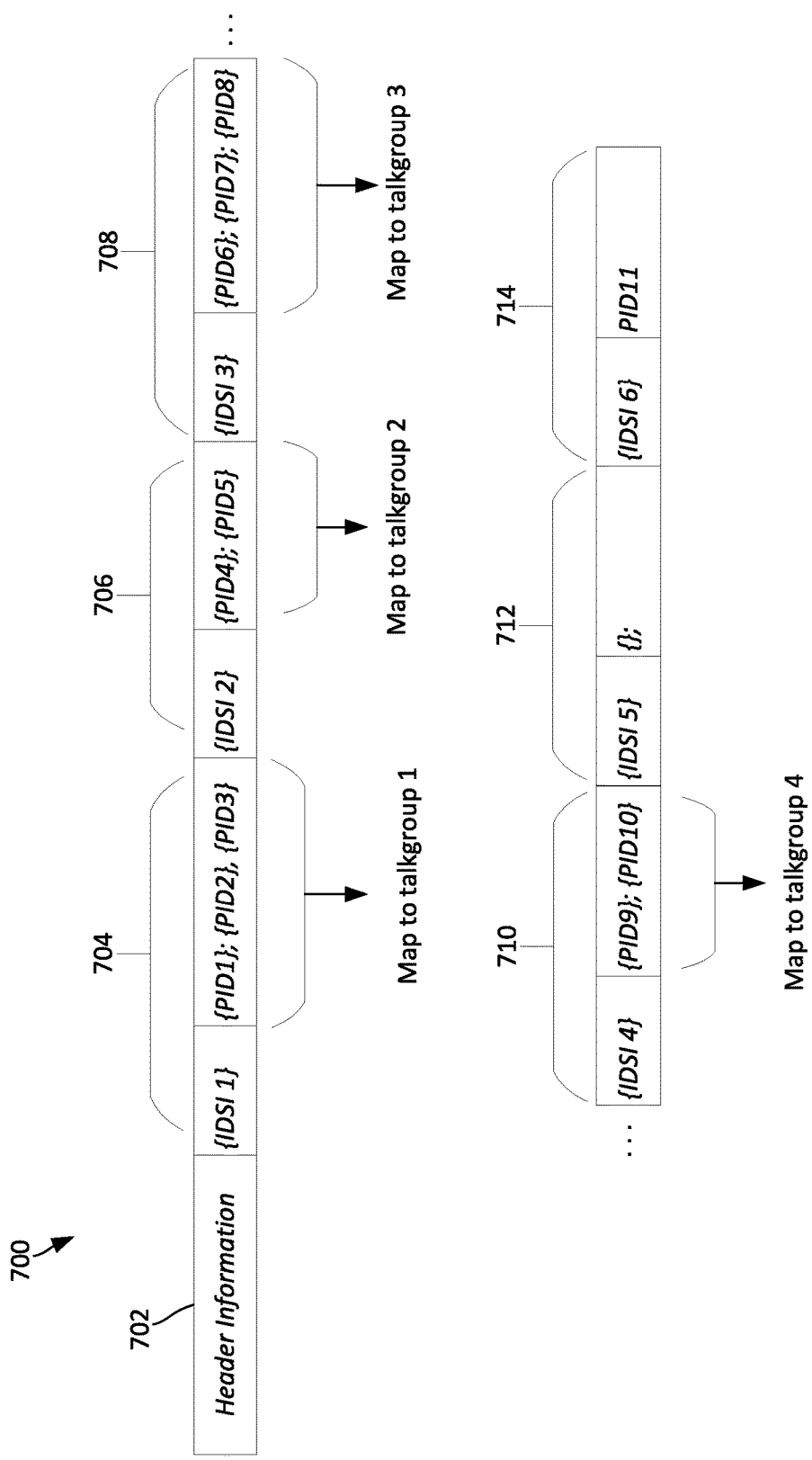
FIG. 7 is a diagram that is useful for understanding an example of a message format which can be used by the WAP.

An exemplary message which is communicated from the WAP is shown in FIG. 7. The message 700 can include a header portion 702, and a plurality of data sets 704-714. In this example, a first data set 704 specifies a first IDSI value {IDSI 1} for an interactive display area (e.g. interactive display area $108_1$), and a first set of PID data {PID1}; {PID2}, {PID3}. As noted above, these PID values are based on TIDs which have been read from SRC tags of placards disposed in that interactive display area. In some scenarios the PID values can be the TID values, although the solution is not so limited. The second data set 706 specifies a second IDSI value {IDSI 2} for an interactive display area (e.g. interactive display area $108_2$), and a second set of PID data {PID4}; {PID5}. These PID values are similarly based on TID read from SRC tags of placards disposed in that interactive display area. Additional data sets 708, 710 and 712 can contain similar data for the remaining interactive display areas. Note that there is no PID data associated with IDSI 5 since interactive display section $108_5$ is unused in the example shown in FIG. 1. A further data set 714 can be used to convey PID information concerning the identify of an incident commander. This data can include a {IDSI 6} and {PID 11}. The PID for the incident commander will be based on a TID received from a command interactive display section 115. Of course, other types of message formats can also be used for the purposes described herein and the message format shown in FIG. 7 is merely intend to illustrate one possible scenario.

The message or messages generated by the WAP 100 are communicated to the TGAS 516. This can be accomplished using the communication facility offered by the LMR network and/or by means of an alternative data network (e.g., an LTE network, or other type of computer network). When the messages are received at the radio system infrastructure, they are routed to the TGAS 516. At 607, the TGAS 516 can use the PID information to perform one or more look-up operations.

Based on information received from WAP 100, the TGAS 516 will at 608 generate one or more control messages for assigning a shared talkgroup or common radio channel to selected ones of the plurality of SR 506. According to one aspect, these assignments can be made in such a way that the SR 506 of members of each particular work group are all assigned to the same talkgroup and/or radio channel. For example, the SR 506 which are associated with PID data {PID}; {PID2}, {PID3} can all be assigned to a first radio channel or first talkgroup; the SR 506 which are associated with PID data {PID4}; {PID5} can be assigned to a second radio channel or second talkgroup; the SR 506 which are associated with PID data {PID6}; {PID7}, and {PID8} can all be assigned to a third radio channel or third talkgroup, and so on.

As noted above, the channel or talkgroup assignments may require one or more look-up operations. These operations may be necessary to associate a particular PID with a radio subscriber ID of an SR 506 that is associated with a particular work group member. In some scenarios, this look-up operation can be performed at the TGAS 516. For example, given the message in FIG. 7, the TGAS 516 can look-up DSID information of the SRs 506 which are associated with PID1, PID2 and PID3. All of these SRs can then be assigned to a first common talkgroup or first shared radio channel which is associated with IDSI 1. The TGAS 516 can then look-up DSID information of the SRs 506 which are associated with PID4, and PID5. These SRs can then be assigned to a second common talkgroup or a second shared radio channel which is associated with IDSI 2. The TGAS 516 can then look-up DSID information of the SRs 506 which are associated with PID6, PID7 and PID8. All of these SRs can then be assigned to a third common talkgroup or third shared radio channel which is associated with IDSI 3. This process can continue until the entire message 700 has been processed.

The location where such look-up operations are performed is not critical. In some scenarios, the look-up operations can be performed at the WAP 100, in which case the message sent to the TGAS 516 would contain DSID information for each of the SRs as the PID information. In still other scenarios, certain look-up operations can be performed in the WAP and other look-up operations can be performed in the TGAS 516.

The specific radios which are to be assigned to each talkgroup or radio channel can be addressed by the radio system infrastructure using the radio DSID information. In particular, the LMR infrastructure can be used at 610 to send one or more control messages to one or more of the SRs 506 to assign a common talkgroup or radio channel to the radio equipment associated with members of each work group. In some scenarios, the particular radio channel or talkgroup that is assigned to a set of SR 506 assigned to a particular work group or IDSI can be consistently mapped to a specific predefined radio channel or talkgroup that is associated with that particular work group or IDSI value. However, the solution is not limited in this regard and in other scenarios the radio channel or talk group chosen for this purpose can be dynamically selected based on one or more communication factors. These factors can include channel availability, the presence of interfering signals, and so on. The process terminates at 612.

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

I claim:

1. An automated talkgroup assignment system, comprising:
a work group assignment panel comprising a display face in which a plurality of interactive display sections are respectively disposed at a plurality of different locations;
each of the interactive display sections configured to removably receive for display one or more of a plurality of placards, each including a short range communication (SRC) tag affixed thereto, and each of the placards comprising textual information disposed on a placard display face thereof which indicates a member of a work group;
each of the interactive display sections including at least one SRC enabled device which is configured to obtain tag identifying data (TID) from at least one SRC tag when the placard associated with the at least one SRC tag is disposed proximate to the SRC enabled device in the interactive display section;
a control processor which is configured to receive a plurality of the TID acquired by the SRC enabled devices respectively associated with the plurality of interactive display sections, the control processor configured to generate at least one data message based on the TID received so as to indicate which of the plurality of placards are displayed respectively in each of the interactive display sections.

2. The automated talk group assignment system according to claim 1, wherein the SRC tag is selected from the group consisting of a radio frequency identification (RFID) tag, a near field communication (NFC) tag, and a barcode tag.

3. The automated talk group assignment system according to claim 1, wherein the at least one data message specifies at least one placard identifying data (PID) for each of the plurality placards displayed in the interactive display sections.

4. The automated talk group assignment system according to claim 3, wherein the at least one PID is selected from the group consisting of the TID, information which directly or indirectly indicates the particular member of the work group identified by the textual information disposed on the placard, and a device subscriber identifier (DSID) which directly or indirectly identifies a particular land mobile radio (LMR).

5. The automated talk group assignment system according to claim 1, wherein the at least one data message includes at least one interactive display section identifier (IDSI) corresponding to one of the plurality of interactive display sections to specify the interactive display section in which one or more of the plurality of placards is displayed.

6. The automated talk group assignment system according to claim 5, wherein the display panel further comprises an IDSI name panel disposed adjacent to each of the interactive display section to facilitate name identification of a work group associated with the interactive display section.

7. The automated talk group assignment system according to claim 6, wherein the IDSI name panel is an electronic display screen responsive to the control processor, whereby textual information displayed on the IDSI name panel can be selectively electronically controlled.

8. The automated talk group assignment system according to claim 6, wherein the IDSI name panel is comprised of an SRC enabled device which is configured to obtain IDSI tag data responsive to an SRC tag disposed in an IDSI name panel placard.

9. The automated talk group assignment system according to claim 8, wherein the control processor is configured to receive the IDSI tag data acquired by the SRC enabled device in the IDSI name panel.

10. The automated talk group assignment system according to claim 3, further comprising a talk group assignment server (TGAS) responsive to the at least one message to utilize an LMR infrastructure to set a talk group or channel to be used by at least one LMR subscriber radio.

11. The automated talk group assignment system according to claim 10, wherein the TGAS is configured to use the PID directly or indirectly to identify the LMR subscriber radio for which a talk group channel is to be set.

12. The automated talk group assignment system according to claim 10, wherein the talk group channel is set in accordance with the interactive display section in which the placard corresponding to the PID is displayed.

13. A method for automated talk group assignment, comprising:
 removably receiving for display one or more a plurality of placards in a plurality of interactive display sections of a display panel, each placard including a short range communication (SRC) tag affixed thereto, and each of the placards comprising textual information disposed on a placard display face thereof which indicates a member of a work group;
 in each of the interactive display sections, using at least one SRC enabled device to obtain tag identifying data (TID) from at least one the SRC tags when the placard associated with the at least one SRC tag is disposed proximate to the SRC enabled device;
 receiving in a control processor a plurality of the TID acquired by the SRC enabled devices, the control processor configured to generate at least one data message based on the TID received so as to indicate which of the plurality of placards are displayed respectively in each of the interactive display sections.

14. The method for automated talk group assignment system according to claim 13, further comprising selecting the SRC tag from the group consisting of a radio frequency identification (RFID) tag, a near field communication (NFC) tag, and a barcode tag.

15. The method for automated talk group assignment system according to claim 13, further comprising specifying with the at least one data message at least one placard identifying data (PID) for each of the plurality placards displayed in the interactive display sections.

16. The method for automated talk group assignment system according to claim 15, further comprising selecting the at least one PID from the group consisting of the TID, information which directly or indirectly indicates the particular member of the work group identified by the textual information disposed on the placard, and a device subscriber identifier (DSID) which directly or indirectly identifies a particular land mobile radio (LMR).

17. The method for automated talk group assignment system according to claim 13, further comprising including in the at least one data message at least one interactive display section identifier (IDSI) corresponding to one of the plurality of interactive display sections to specify the interactive display section in which one or more of the plurality of placards is displayed.

18. The method for automated talk group assignment system according to claim 17, further comprising displaying on the display panel an IDSI name panel adjacent to each of the interactive display section to facilitate name identification of a work group associated with the interactive display section.

19. The method for automated talk group assignment system according to claim 18, further comprising selecting the IDSI name panel to include an electronic display screen responsive to the control processor, and selectively electronically controlling with the control processor textual information displayed on the IDSI name panel.

20. The method for automated talk group assignment system according to claim 18, further comprising using an SRC enabled device in the IDSI name panel to obtain IDSI tag data responsive to an SRC tag disposed in an IDSI name panel placard.

21. The method for automated talk group assignment system according to claim 20, further comprising receiving at the control processor the IDSI tag data acquired by the SRC enabled device in the IDSI name panel.

22. The method for automated talk group assignment system according to claim 15, further comprising utilizing a talk group assignment server (TGAS) in communication with an LMR infrastructure to set a talk group or channel to be used by at least one LMR subscriber radio.

23. The method for automated talk group assignment system according to claim 22, further comprising causing the TGAS to use the PID directly or indirectly to identify the LMR subscriber radio for which a talk group channel is to be set.

24. The method for automated talk group assignment system according to claim 22, further comprising setting the talk group channel in accordance with the interactive display section in which the placard corresponding to the PID is displayed.

\* \* \* \* \*